United States Patent
Sparks (10) Patent No.: US 8,140,475 B1
(45) Date of Patent: Mar. 20, 2012

(54) DYNAMIC CONFIGURATION ARCHIVAL AND RETRIEVAL

(75) Inventor: Jud Sparks, Vallejo, CA (US)

(73) Assignee: NetApp, Inc., Sunnyvale, CA (US)

( * ) Notice: Subject to any disclaimer, the term of this patent is extended or adjusted under 35 U.S.C. 154(b) by 269 days.

(21) Appl. No.: 10/788,122

(22) Filed: Feb. 26, 2004

(51) Int. Cl.
G06F 7/00 (2006.01)
G06F 17/00 (2006.01)
G06F 15/177 (2006.01)

(52) U.S. Cl. .................. 707/634; 707/681; 709/221

(58) Field of Classification Search .............. 707/100, 707/202–204, 634, 681; 709/221; 713/2, 713/100; 714/15; 700/220
See application file for complete search history.

(56) References Cited

U.S. PATENT DOCUMENTS

| | | | | |
|---|---|---|---|---|
| 5,497,490 A | * | 3/1996 | Harada et al. ............... | 713/100 |
| 6,430,687 B1 | * | 8/2002 | Aguilar et al. ............... | 713/2 |
| 6,640,291 B2 | * | 10/2003 | Fujibayashi et al. ......... | 711/162 |
| 6,711,593 B1 | * | 3/2004 | Gordon et al. ............... | 707/204 |
| 6,714,949 B1 | * | 3/2004 | Frey, Jr. ...................... | 707/200 |
| 6,976,065 B2 | * | 12/2005 | Kaiser et al. ................. | 709/221 |
| 7,313,578 B2 | * | 12/2007 | Gagne et al. ................. | 707/204 |
| 7,315,903 B1 | * | 1/2008 | Bowden ....................... | 709/250 |
| 2003/0055529 A1 | * | 3/2003 | Aosawa ....................... | 700/220 |
| 2003/0101245 A1 | * | 5/2003 | Srinivasan et al. ............ | 709/221 |
| 2004/0193953 A1 | * | 9/2004 | Callahan et al. .............. | 714/15 |

* cited by examiner

Primary Examiner — Apu Mofiz
Assistant Examiner — Chelcie Daye
(74) Attorney, Agent, or Firm — Suiter Swantz pc llo (57) ABSTRACT

The present invention is a method and system for retrieving and retaining data relating to the configuration of a storage system. Data relating to the configuration of a storage system may be retrieved and stored in an accessible file, stored locally or remotely. When a loss of configuration data event occurs, such as a catastrophic failure of a storage system, a configuration file in accordance with the present invention may be retrieved and loaded into the computing system of the storage system in order to rebuild the storage system with the set of configuration settings stored on the configuration file of the present invention. A detection module of the present invention may also detect a change of configuration data such that the configuration file may reflect the most current configuration for a storage system.

12 Claims, 10 Drawing Sheets

DYNAMIC CONFIGURATION ARCHIVAL AND RETRIEVAL

FIELD OF THE INVENTION

The present invention generally relates to the field of storage system configuration, and more particularly to a method and system for archiving and retrieving configuration information of a storage system.

BACKGROUND OF THE INVENTION

Data storage management requires regular maintenance in order for the data storage system to operate optimally. Typically, an amount of data storage necessary to support a consumer expands. Additionally, other types of data storage issues may change for a consumer, including data access, scalability, availability, redundancy and data protection. In order to optimize performance of a storage system, the hardware and operating software of a computing system of a storage system is configured to suit the requirements of a particular consumer.

Additional software, software updates, and/or new hardware may be employed to support a change in the storage system to provide additional storage or additional functionality. A drawback associated with software or hardware installation may be the concurrent loss of configuration settings of the storage system. Additionally, during a catastrophic failure of the storage system, while data may be retrievable, configuration settings for the storage network are typically lost. When configuration settings for a storage system are lost, an administrator of the storage network must manually reset the configuration settings as they were prior to the new installation or failure. This may lead to excessive down-time of the storage system.

In general, configuration settings refer to the information or data required by a computer system of the storage system to integrate its component parts into the overall system for purposes of enabling the set up and sound operation of the storage system. When installing hardware and software, configuration data may be used in configuring the system and the methodical process of defining options that are provided by the hardware and software for installation. Any setting that may be designated by an administrator of a storage system may be included within a set of configuration settings. For example, configuration settings of a storage system include data pertaining to specific hardware, (CPU, hard drives, local storage, remote storage, peripherals and the like) and software (operating system, BIOS, interfaces, applications, and the like) along with details of devices coupled to the storage system such as type, capability and the like. When the storage system is part of a network, configuration settings may include information about I/O devices and the network that enables communication between the operating system of a computer and those devices of the network including communication protocols and features relating to communication protocols. A set of configuration settings may also include tree structures, drivers, logical unit settings, licenses, permissions and the like.

With such a vast amount of information associated with a configuration of a storage system, any loss of a set of configuration settings causes a substantial amount of resources and time dedicated to re-build the storage network. Consequently, a method and system for archiving and retrieving configuration information for the storage system is necessary.

SUMMARY OF THE INVENTION

Accordingly, the present invention is directed to a method and system for retrieving and retaining data relating to the configuration of a storage system. In an embodiment of the invention, data relating to the configuration of a storage system may be retrieved and stored in an accessible file, stored locally or remotely.

In a second aspect of the present invention, upon a loss of configuration data event, such as a catastrophic failure of a storage system, a configuration file in accordance with the present invention may be retrieved and loaded into the computing system of the storage system in order to restore the storage system with the set of configuration settings stored on the configuration file of the present invention.

In yet another aspect of the present invention, a detection module of the present invention may detect a change of configuration data. As it may be advantageous for the configuration file of the present invention to reflect the most current configuration for a storage system, the detection module may detect a change in the configuration of a storage system and may facilitate, through various alternative mechanisms, the ability to update configuration information stored on one or more files.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1-10, a method and system is disclosed for retrieving configuration data of a system, such as a storage system, retaining the configuration data, detecting changes in the configuration settings of a system, and restoring a system utilizing the retained configuration data. In an advantageous aspect of the present invention, if a computer system of the storage system should lose its configuration settings, the configuration data retrieved from a system and retained in an identifiable and accessible file may be loaded within a computing system of the system in order to restore the configuration of the system without the requirement of an administrator manually resetting the configuration settings of the system. As used herein, administrator may refer to a person responsible for maintaining a group or network of computer systems (one or more) and related resources, including registering users and user passwords. In UNIX® systems, the administrator typically has a superuser or administrator account that provides complete control over everything in the computing systems or network. The term may be extended to include service providers that assist the administrator in servicing, upgrading, troubleshooting and repairing the computer systems or network.

Figure 1:
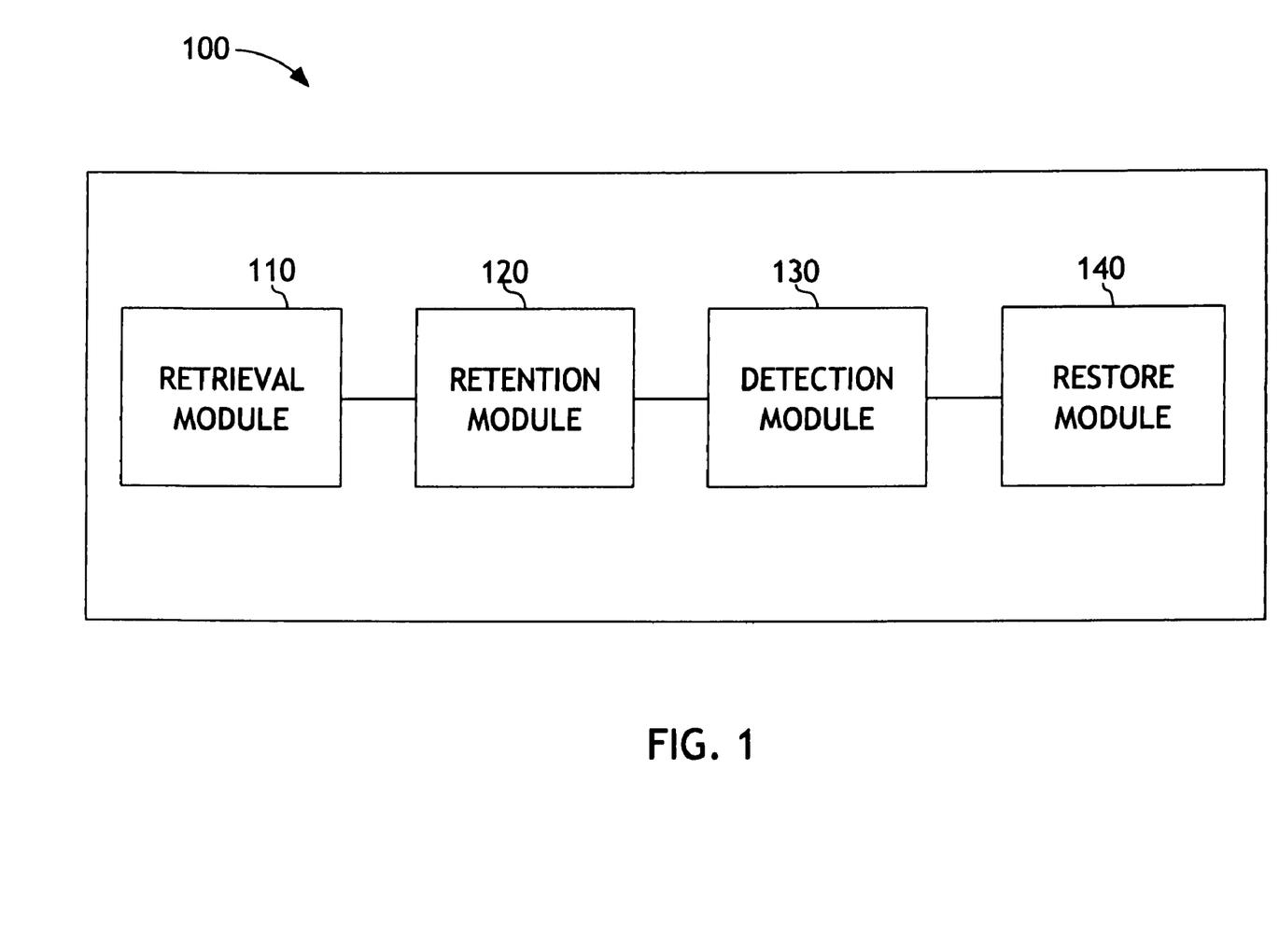
FIG. 1 depicts a diagram of the modules of operating system software in accordance with the present invention.

Referring to FIG. 1, a diagram of the modules of operating system software 100 in accordance with the present invention is shown. Operating system software 100, in one embodiment of the invention, may be suitable for use with a storage system environment due to the number of features and settings that may be created to optimize performance of the storage system for a consumer. As used herein, the term operating system software 100 generally refers to the computer-executable code operable on a computer that manages computer operations and provides computer functionality. For example, an operating system used in storage systems may manage data access and may implement data access semantics. An operating system, as that term is used herein, can be implemented in a variety of ways, including as a microkernel (such as the Data ONTAP storage operating system discussed elsewhere herein, an application program or middleware operating or intended for operation over a general-purpose operation system, such as UNIX® or Windows NT®, or as a general-purpose operating system with configurable functionality, which is configured for specific applications.

Operating system software 100 may include various modules which are designed to perform functions that may allow the retrieval of configuration information, retention of configuration information, detection of a change in configuration information and restoration of a system upon a loss of configuration event.

For example, operation system software 100 may include a retrieval module 110, a retention module 120, a detection module 130, and a recovery module 140. It should be understood by those with ordinary skill in the art that modules 110-140 may refer to various functions that may be provided and implemented through software code as part of the operating system software 100 executed by a processing unit of a computing system, a computing system of a storage system for example. Consequently, modules 110-140 may refer to a group of instructions, or software code, executed by a processor to provide the functionality in accordance with the present invention. Each module 110-140 may be discussed in turn.

Retrieval module 110 may refer to the reading of a configuration of a system and collecting of configuration data which represent the configuration of the system. The configuration of a system may be acquired by the manual setting of the system by an administrator. An administrator may configure the system through a user interface of a computing system. Alternatively, configuration settings may be input through other means, for example, the coupling of components, devices and the like and automatically uploading information from such components and devices, such as is often possible with so-called "hot plug" devices using techniques known in the art. A configuration may also include default settings of the storage system.

A configuration of a system, once obtained, may be read when a retrieval module 110 accesses a system configuration file stored within the memory of a computing system. In an embodiment of the invention, a macro may be executed whereby the configuration settings reflected in a system configuration file may be retrieved. For example, by employing Windows® telnet.exe file, the current configuration settings for a storage system may be accessed. A macro of the present invention may strip the configuration settings from the telnet.exe file to obtain the current configuration settings of the storage system. It is contemplated that other methods to retrieve configuration settings, for example use of hyper-terminals and direct connections to the computing system may be employed by those with ordinary skill in the art without departing from the scope and spirit of the present invention.

Retention module 120 may control the storage of the configuration data on an identifiable and accessible file. It is contemplated that the configuration file storing the set of configuration settings may only utilize a maximum of e.g., 10 megabytes of storage space. It is further contemplated that the user may dictate the type of memory which is employed to store the file which stores configuration data, namely a configuration file. For example, a configuration file may be stored locally within the computer system, network attached storage, and remotely accessed via a worldwide network such as the Internet. Further, it is contemplated that primary, secondary and backup configuration files may be created in case a file storing configuration data becomes corrupted.

Detection module 130 may refer to the detection of a change in the configuration of a system. It is contemplated upon the regular use of a system, changes to an original configuration of a system may occur. One type of change to a configuration of a system may arise when a system's software or hardware is upgraded. For example, the coupling of components, devices and the like and automatically uploading information from such components and devices, such as is often possible with so-called "hot plug" devices using techniques known in the art results in a change to the configuration. Additionally, an administrator may implement software setting changes to the configuration. It is contemplated that detection module 130 may be capable of detecting any type of change associated with a configuration of the storage system.

When a change to an original configuration occurs, it may be valuable for the administrator of the system to have the configuration file reflect the current configuration of the system. Detection module 130 of the present invention may be capable of detecting a change in the configuration of the system and may prompt further action to incorporate the changed configuration information into one or more files storing the configuration data. For example, the new configuration data reflecting the change in configuration information may be integrated within a configuration file, a new configuration file, a revision file and the like via a command by the administrator, automatically and periodically as discussed herein. It is further contemplated that detection module 130 may work in conjunction with retention module 120 in order to retain previous configuration information, thus maintaining a plurality of files which may include configuration data of a plurality of configurations.

Restore module 140 may refer to the instructions and code for restoration of a system. If a configuration of a system is lost, for example by a catastrophic failure of a system, restore module may provide a mechanism to rebuild the storage system in conformity with the configuration prior the catastrophic failure. Another type of loss of configuration event may be the installation of new hardware within a system, such as the installation of a new computing system within a storage system. Restore module 140 may be utilized in order to rebuild systems with previous configurations in an attempt to provide optimal performance of the system. For example, as multiple previous configurations other than the immediately prior configuration may also be retained, restore module 140 may be utilized to build multiple previous configurations employed by a system. Restore module 140 may be utilized to retrieve the configuration file and load the file into the computing system, thus rebuilding the system in compliance with the configuration data stored on the configuration file.

As stated, retention module 120 may control the storage of the configuration data on an identifiable and accessible file. In an advantageous aspect of the present invention, an administrator may dictate the location of a configuration file via the retention module 120. Further, retention module 120 may be controlled by an administrator to provide multiple copies of configuration files. For example, primary, secondary and backup configuration files may be created. Additionally, multiple configuration files containing revisions of configurations of the system may also be retained.

Figure 2:
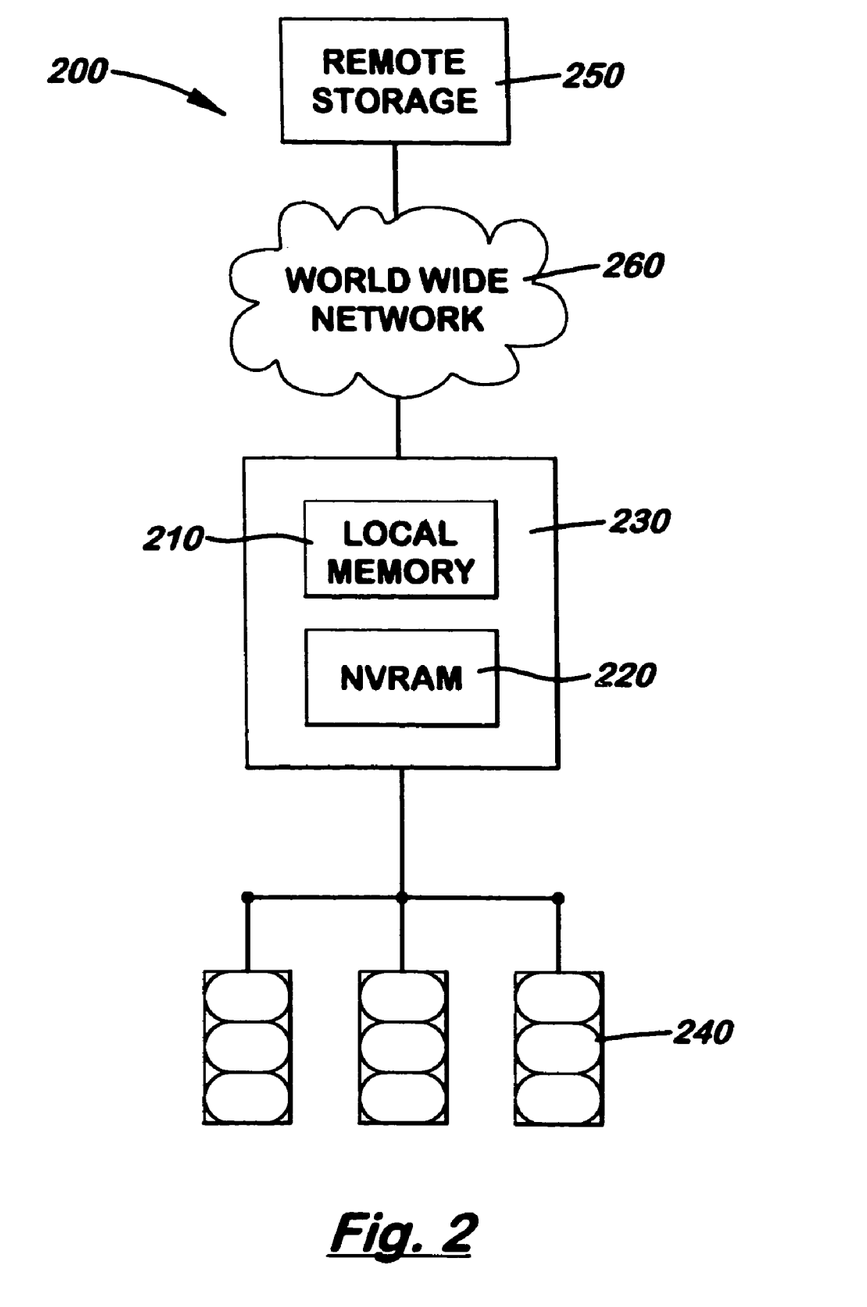
FIG. 2 depicts a diagram of various locations in which a configuration file may be stored in accordance with an embodiment of the present invention.

Referring now to FIG. 2, a diagram of various locations 200 in which a configuration file may be stored is shown. Locations in which a configuration file may be stored may include local memory 210 and non-volatile random access memory 220 of a computing system 230 of the storage system. In one embodiment of the invention, local memory 210 may include the hard drive memory of the computing system 230.

Storage coupled to the computing system 230 may also be employed to store a configuration file. For example, network attached storage 240 may be employed. Network attached storage may include a redundant array of inexpensive disks (RAID) storage and the like. Further, storage may include remote storage 250, such as storage accessible via a worldwide network 260 such as the Internet.

It is contemplated that it may be advantageous to provide multiple copies of configuration files in order to provide redundancy. For example, an administrator may identify network attached storage 240 for the configuration file, and may include a copy of the configuration file in remote storage 250. This may be advantageous as it may allow retrieval of a configuration file if one copy becomes corrupted, or alternatively, if one type of storage is damaged whereby the configuration file may not be accessed. Additionally, a primary/secondary access routine may be implemented within the retention module 120 whereby a configuration file is retrieved from a first location (a primary file) and if the primary file is corrupted, a configuration file from a second location is retrieved (a secondary file).

In order to ensure that a configuration file is updated to reflect the latest configuration of a storage system, detection module 130 of FIG. 1 may detect a change in the configuration of a storage system. It is contemplated that changes to the configuration settings may be implemented by an administrator during operation of the storage system to enhance performance of the storage system.

Figure 3:
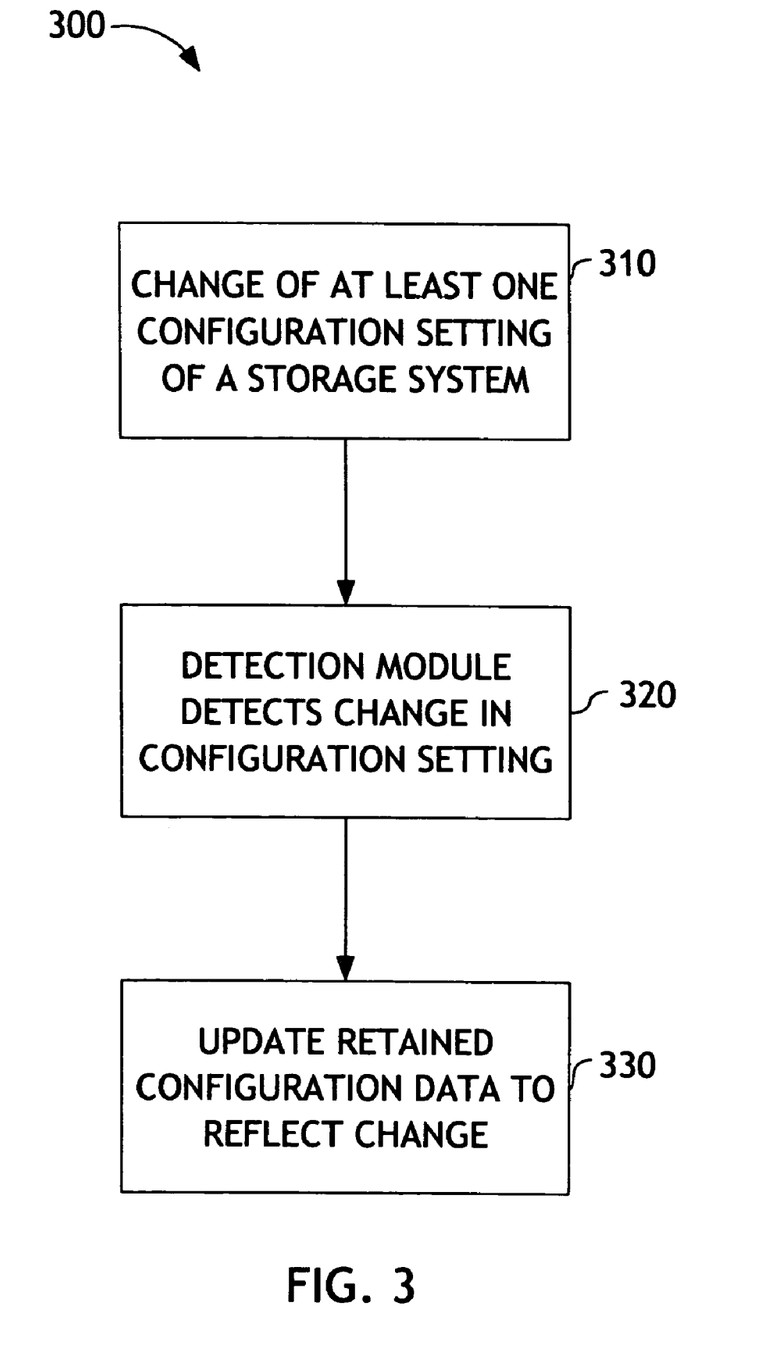
FIG. 3 depicts a flow diagram of a process for updating a configuration file upon the detection of a change in the configuration settings in accordance with the present invention.

Referring to FIG. 3, a flow diagram of a process 300 for updating a configuration file upon the detection of a change in the configuration settings is shown. Process 300 may begin when at least one configuration setting of a storage system is changed 310. A change of a configuration setting of a storage system may be effectuated by an administrator in a similar fashion to the original input of configuration settings. A change in a configuration setting may include storage expansion, upgrades, repair of malfunctioning equipment, and the like. Coupling of components, devices and the like and automatically uploading information from such components and devices, such as is often possible with so-called "hot plug" devices using techniques known in the art may also result in a change to the configuration. It is contemplated that detection module 130 may be capable of detecting any type of change associated with a configuration of the storage system.

Next, detection module 130 of the present invention may detect that a change in a configuration setting has been implemented 320. Detection of a change may be effected by detecting configuration information, e.g., for a newly added device and treating such configuration information as a change or detecting new configuration information and comparing it with configuration information in the current or active configuration file, and if different, noting the change in configuration information. Detection of a change in a configuration setting may be executed in a similar fashion as discussed previously with respect to retrieval of the configuration settings. For example, a system configuration file such as Windows® telnet.exe may be employed. When a change in at least one configuration setting is implemented, it may be reflected by a corresponding change in the system configuration file. When the change in the system configuration file occurs, this may alert the system of the present invention that a change in at least one configuration setting has taken place.

Once a change of a configuration setting has been detected, the retained configuration data may be updated to reflect the change in the configuration setting 330. Detection of a change in a configuration setting may automatically prompt further action to incorporate the changed configuration information into one or more files storing the configuration data. For example, the new configuration data reflecting the change in configuration information may be integrated within a configuration file, a new configuration file, a revision file and the like. It is further contemplated that a variety of alternatives, selectable by an administrator, may be effectuated in order to retain the latest configuration information. Detection module 130 may be capable of detecting a change and retention module 120 may control storage of an updated configuration file that replaces the previous configuration file, a new configuration file with retention of previous configuration files, and an original configuration file in conjunction with revision files. Each of the alternatives may be discussed in turn.

In one embodiment of the invention, an updated configuration file, reflecting the latest configuration of a storage system, may replace an original configuration file or a previous configuration file. In an advantageous aspect of the present invention, the updated configuration file may include a timestamp. This may allow an administrator to easily determine the date in which updated configuration file was created. It is contemplated that the updated configuration file may be created "on command" by an administrator. In one embodiment of the invention, upon a detection of a change of at least one configuration setting, the system of the present invention may query an administrator to create an updated configuration file. Further, it is contemplated that the updated configuration file may be automatically created upon detection of a change of at least one configuration setting. It is also contemplated, in an alternative embodiment, that an updated configuration file may be created according to a periodic schedule. For instance, an updated configuration file may be created each day, week, month, or the like in an automatic fashion.

In an alternative embodiment of the invention, a new configuration file reflecting the latest configuration of a storage system may be created while maintaining original and/or previous configuration files. In an advantageous aspect of the present invention, a new configuration file may include a timestamp. A timestamp may mean marking a configuration file with the date/time of its creation or other unique identifying data, such as sequential numbering of configuration files to enable the selective recovery of previous configuration files. This may allow an administrator to easily determine the date in which updated configuration file was created. An advantageous aspect of retaining previous configuration files is that it may allow an administrator to restore the configuration settings to a prior configuration rather than the latest version of configuration settings. This may be advantageous as it may allow an administrator of a storage system to easily rebuild a prior configuration. For example, if a change in a configuration setting has caused a reduction in performance of the storage system, an administrator may wish to install a prior configuration in which performance was optimized. Thus, an administrator may easily rebuild the storage system by loading a previous copy of a configuration file as implemented by the restore module 140.

Figure 4:
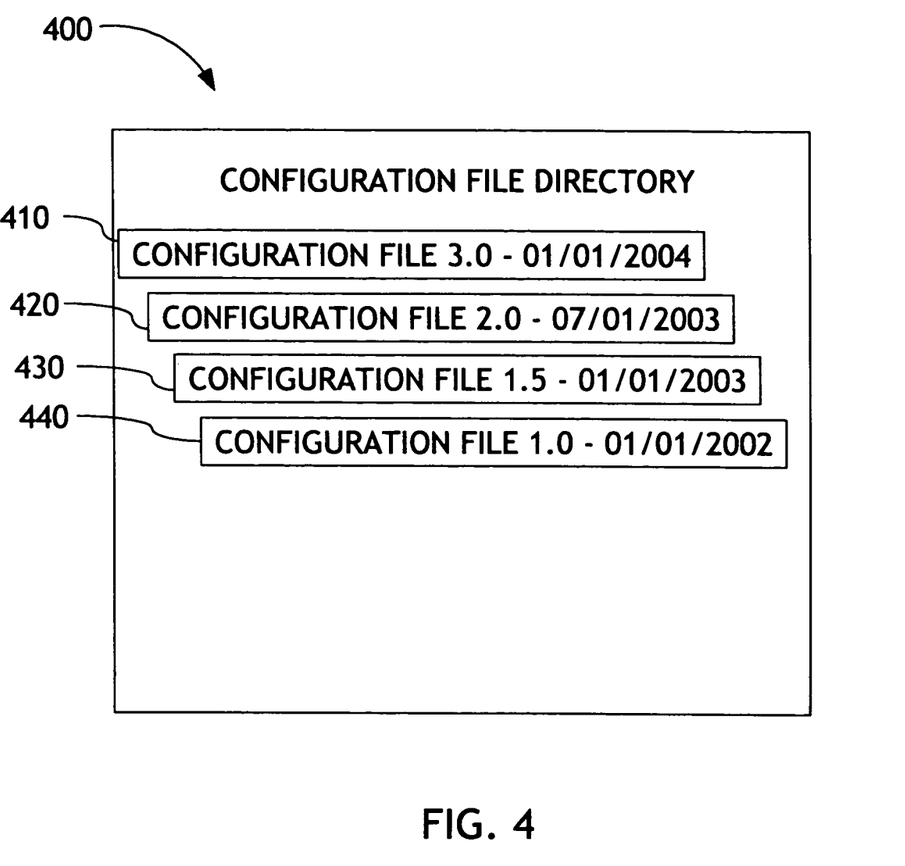
FIG. 4 depicts a diagram of a file directory for configuration files in accordance with the present invention.

Referring to FIG. 4, a diagram of a file directory for configuration files in accordance with the present invention is shown. File directory 400 may include the latest configuration file 410, along with previous configuration files 420-440. Each configuration file 410-440 may store a set of configuration settings and may be identifiable with a unique identifier. The unique identifier may be a file name. Further, each of the configuration files 410-440 may include a timestamp whereby the date in which the configuration file may have been produced is listed. It is contemplated that file directory 400 may be stored in a variety of locations as shown in FIG. 2, including non-volatile random access memory, local memory, network attached storage and remote memory. From said file directory, a specific configuration file may be accessed. The configuration files 410-440 may be located in a same physical location as the directory 400 or, in an alternative embodiment of the invention, a unique physical location as discussed previously.

With retention of previous configurations, it may be advantageous to remove configuration files from the file directory 400. This may prevent an administrator from loading a configuration file representing a non-optimal configuration. For example, previous configuration files may include an expiration date (not shown) whereby after a period of time, the configuration file is removed. As an example, configuration file 440 may be automatically removed on Jan. 1, 2005 if there is an expiration date of three years for each configuration. Additionally, if a previous configuration had deficiencies, it may be advantageous to remove the configuration file representing the previous configuration. Consequently, an administrator may be capable of removing a configuration file from a file directory 400 on command.

Similar to the embodiment of the creation of an updated configuration file, it is contemplated that a new configuration file may be created "on command" by an administrator. In one embodiment of the invention, upon a detection of a change of at least one configuration setting, the system of the present invention may query an administrator to create a new configuration file. Further, it is contemplated that the new configuration file may be automatically created upon detection of a change of at least one configuration setting. It is also contemplated, in an alternative embodiment, that a new configuration file may be created according to a periodic schedule whereby a new configuration file is created daily, weekly, monthly and the like.

In yet another embodiment of the invention for storing the latest configuration of a storage system, an original configuration file may be utilized in conjunction with revision files. Retrieval module 110 of FIG. 1 may be capable of creating a configuration file representative of the configuration of the storage system as previously discussed. When a detector module 130 detects a change in a configuration setting, a file representing the change in a configuration setting may be created. In this fashion, the latest configuration file may be represented by the original configuration file and any revision files representing changes to the original configuration of the storage system. Thus, revision files may only represent changes to the original configuration. This may be advantageous as it may require less storage space than original configurations, previous configurations and the like.

Figure 5:
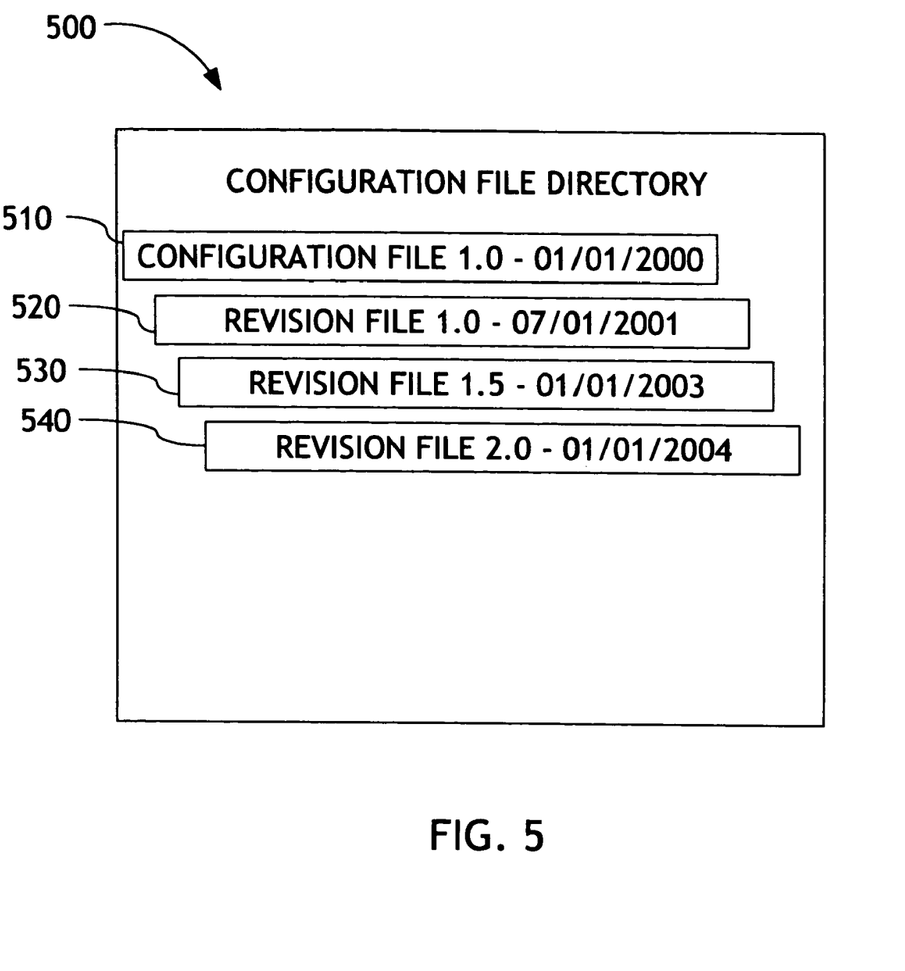
FIG. 5 depicts a diagram of a file directory representing a latest configuration of a system including an original configuration file and revision files.

Referring to FIG. 5, a diagram of a file directory 500 representing a latest configuration of a system including an original configuration file and revision files is shown. Each configuration file 510-540 may store a set of configuration settings and may be identifiable with a unique identifier. The unique identifier may be a file name. Further, the original configuration file 510 and the revision files 520-540 may be timestamped whereby an administrator may easily determine the date of execution of the change. A timestamp may mean marking a configuration file with the date/time of its creation or other unique identifying data, such as sequential numbering of an original configuration file 510 and revision files 520-540 to enable the selective recovery of previous configuration files. In order to restore a particular configuration where changes have been made to the original configuration, the original configuration file may be merged with one or more revision files 520-540 to represent a desired configuration. An advantageous aspect of the file directory 500 is the ability to restore a storage system in accordance with an original configuration or alternatively, to a configuration with one or several changes.

In order to obtain the latest configuration, revision file 540 may be selected by an administrator for loading as discussed with respect to the restore module 140. A previous configuration may be obtained by selecting revision files 520-530 or configuration file 510. It is contemplated that other types of mechanisms may be employed to store configuration data along with revision information by those with ordinary skill in the art without departing from the scope and intent of the present invention.

A revision file may be created "on command" by an administrator following a change in a configuration setting. Alternatively, in one embodiment of the invention, upon a detection of a change of at least one configuration setting, the system of the present invention may query an administrator to create a revision file. Further, it is contemplated that a revision file may be automatically created upon detection of a change of at least one configuration setting.

As discussed previously with respect to a configuration file stored in various locations as shown in FIG. 2, original configuration files, updated configuration files, new configuration files, previous configuration files, and revision files may also be stored in local memory and NVRAM of a computing system along with network attached storage and remote storage. Further, it is contemplated that multiple copies of these same files may be stored in multiple physical locations to provide redundancy and backup protection. Additionally, a primary/secondary access routine may be implemented for all the various types of configuration files and revision files whereby a file is retrieved from a first location (a primary file) and if the primary file is corrupted, a file from a second location is retrieved (a secondary file).

The advantage of obtaining the configuration settings of a storage system and retaining a configuration file is that an administrator may easily rebuild a storage system in compliance with the configuration file in accordance with the present invention. Restore module 140 of FIG. 1 may restore a storage system in conformity with the configuration settings of a configuration file. Restore module 140 may be utilized to retrieve the desired configuration file and load the desired configuration file into the computing system, thus rebuilding the system in compliance with the configuration data stored on the configuration file. It is contemplated that the desired configuration file may be an original configuration file, an updated configuration file, a new configuration file, a previous configuration file, or an original configuration file merged with one or more revision files as previously discussed.

Figure 6:
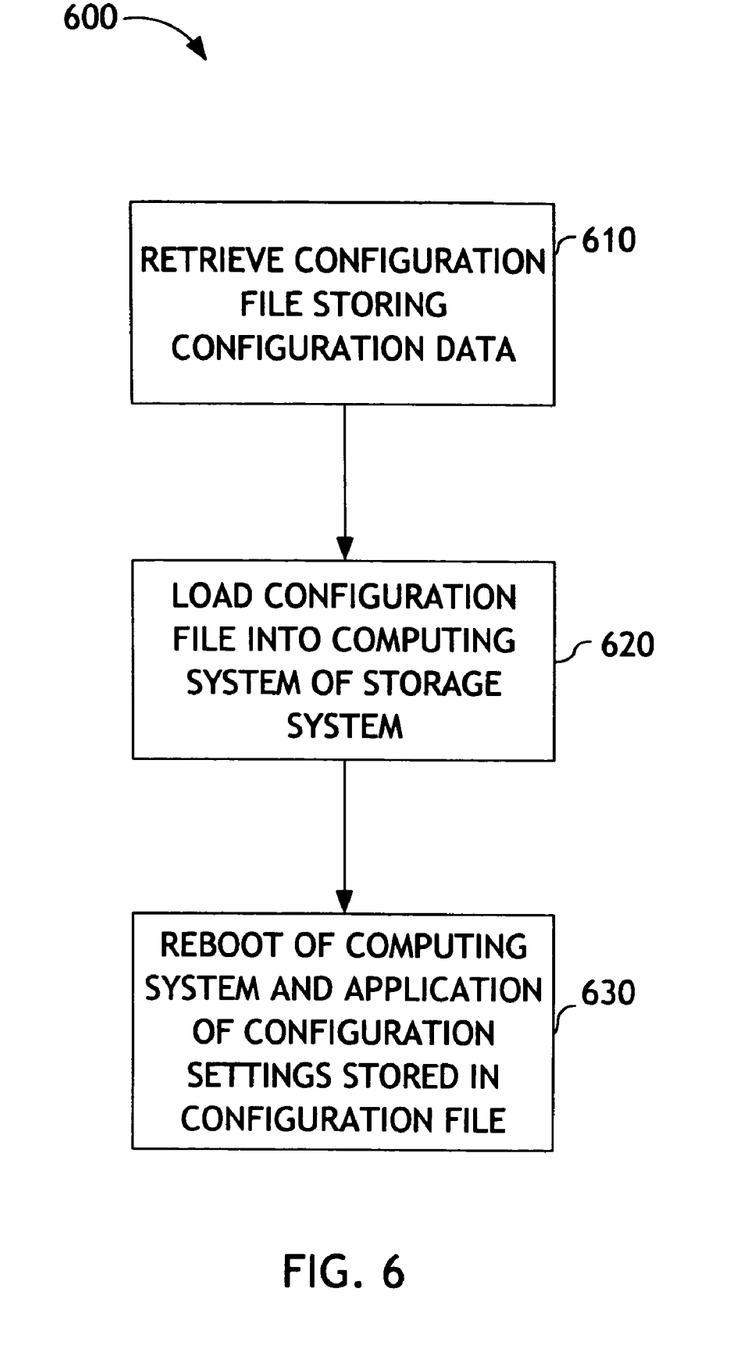
FIG. 6 a flow diagram of a process for restoring a storage system in conformity with a stored set of configuration settings in accordance with the present invention.

Referring to FIG. 6, a flow diagram of a process 600 for restoring a storage system in conformity with a stored set of configuration settings in accordance with the present invention is shown. It is contemplated that process 600 may be implemented by a system administrator to restore a storage system when the storage system is currently active and functioning. Process 600 may begin by the retrieval of the configuration file storing the set of configuration settings of the storage system 610. The configuration file may be loaded 620. Upon a reboot of the computing system, the configuration settings stored in the configuration file may be applied 630.

In one embodiment of the invention, process 600 may be implemented in a command, entered via a user interface of a computing system by an administrator of the storage system. The command may download the desired file to the desired computing system, such as [download-dcar"dcar path and file name"]. This will load the configuration file as desired by "file name" into the "dcar path". It is contemplated that the file may be stored locally within the computing system or remote to the computing system. Once the download has been completed, a command may be entered [reboot-t 0] to reboot the computing system and apply the configuration settings stored in the configuration file. Once the reboot has completed, the storage system will have the configuration settings associated with the configuration file that was loaded. As discussed with the embodiment whereby an original configuration is utilized with revision files, the revision file name may be entered into the section of the file name of the command in order to obtain the desired configuration for the storage system.

It is contemplated that during a catastrophic failure of the storage system, the storage system may not be capable of active operation. In such an instance, an alternative method of restoring the storage system to the desired configuration may be implemented. This may be referred to as a boot restore.

Figure 7:
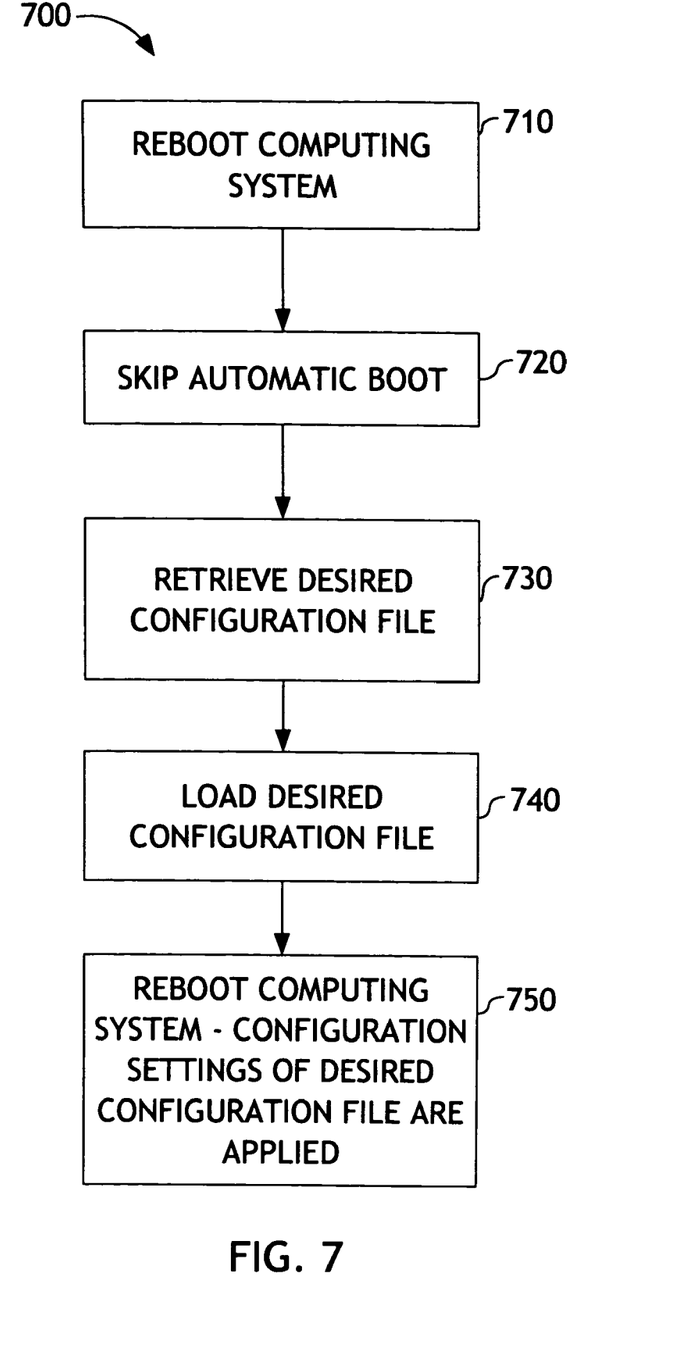
FIG. 7 depicts a process of implementing a boot restore in accordance with the present invention.

Referring now to FIG. 7, a process 700 of implementing a boot restore in accordance with the present invention is shown. Process 700 may begin upon a reboot of a computing system of the storage system by cycling the power 710. Cycling the power may refer to flipping the power switches of the computing system. The next step may be skipping an automatic boot 720. This may be achieved by entering a command such as CTRL+BACKSPACE may be entered on the keyboard of the user interface until a message "Skipping Auto-Boot" appears. The desired configuration file may be retrieved in step 730 and loaded in step 740. Steps 730 and 740 may be implemented by entering a command at an OK prompt, an exemplary command being "[dcar boot "source IP" "dcar file name" "assigned filer IP"]. This may load the configuration file name "dcar file name" into the Internet Protocol address of the computing system of the storage system. When the prompt "completed" appears, a command such as "bye" is entered to reload the computing system. Upon a reboot of the system 750, the system will now have the configuration settings associated with the configuration file that was loaded. Again, as discussed with the embodiment whereby an original configuration is utilized with revision files, the revision file name may be entered into the section of the file name of the command in order to obtain the desired configuration for the storage system.

An advantageous aspect of the present invention is the ability to remotely restore a configuration. Typical with networked storage solutions and clustered environments for storage, computing systems of storage systems may be located in distinct environments. Since each computing system may be linked in a network and may include an Internet protocol address or similar addressing scheme, the restore capability may be achieved by an administrator on a computing system at a distinct location to the computing system that is being restored. This may be accomplished by addressing the configuration file that may be stored remotely, and addressing the computing system in which the configuration file will be loaded.

Figure 8:
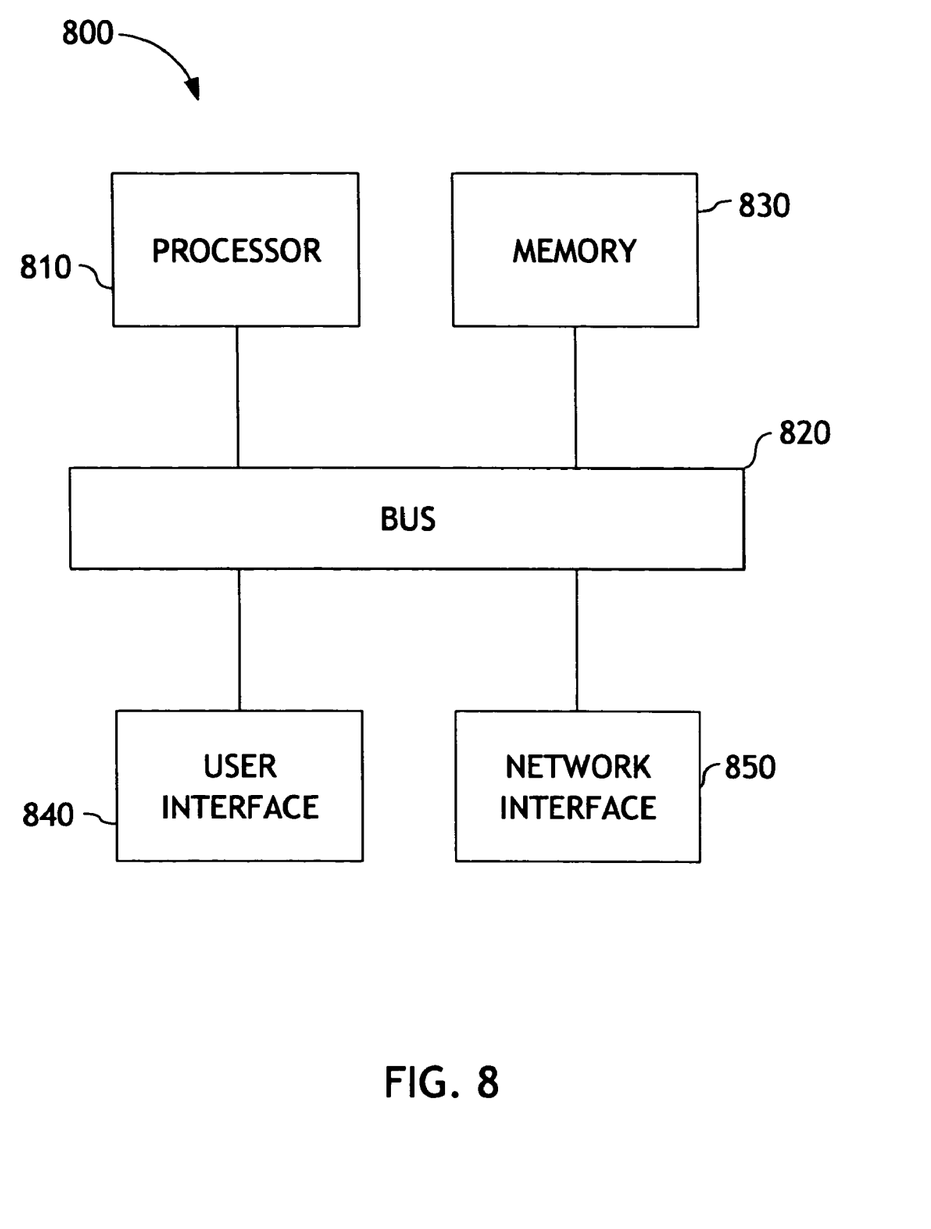
FIG. 8 depicts a block diagram of a computing system in accordance with an embodiment of the present invention.

Referring to FIG. 8, a block diagram of a computing system 800 in accordance with an embodiment of the present invention is shown. Computing system 800 may include a processor 810, a bus 820, a memory 830, user interface 840, and a network interface element 850. It is contemplated that computing system 800 may be implemented as a personal computer, server, and the like without departing from the scope and intent of the present invention.

Processor 810 may include one or more central processing units such as microprocessors or microcontrollers for executing programs stored in memory 830, performing data manipulations and controlling the tasks of the computing system 800. Communication with the processor 810 may be implemented through a message or system bus 820 for transferring information. Bus 820 may include a data channel for facilitating information transfer between storage and other peripheral devices of the computing system 800. Bus 820 may further provides the set of signals required for communication with the processor 810, including a data bus, address bus, and control bus. Bus 820 may comprise any state of the art bus architecture according to promulgated standards, for example industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 820 may be compliant with any promulgated industry standard. For example, the system bus 820 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), as examples.

Memory 830 may include random access memory (RAM) and may also include read only memory (ROM). Memory 830 may also include non-volatile random access memory (NVRAM). User interface 840 may include input elements such as a keyboard, mouse and the like whereby an administrator may enter commands that may be executed by processor 810.

A network interface element 850 may provide transfer of data video and the like between the computing system 800 and remote servers, workstations, storage and the like including network attached storage. The network interface element 850 may implement industry promulgated architecture standards, including Recommended Standard 232 (RS-232) promulgated by the Electrical Industries Association, Infrared Data Association (IrDA) standards, Ethernet IEEE 802 standards, Fibre Channel, Fibre Channel over Internet Protocol, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and Internet Small Computer System Interface (iSCSI) as examples.

It is contemplated that computing system 800 may include operating system software 100 as shown in FIG. 1 stored in memory 830 to provide storage system management. Operating system software 100 of FIG. 1 may include the may be capable of providing heterogeneous access to data using block-level and file-level protocols from the same software. Storage consolidation, scalability, maximum reliability and maximum availability may be examples of features provided by operating system software run by computing system 800.

It is further contemplated that operating system software 100 may include configuration settings in order to optimize performance of the storage system. For example, access, consolidation, and availability, features available on operating system software, may be configured to optimize performance of the storage system for a particular consumer. In an embodiment of the invention, one type of operating system software may be Data ONTAPT™ Software written by Network Appliance of Sunnyvale, Calif. By employing Data ONTAPT™, the storage system of the present invention may be configured to operate within a UNIX®, Windows® and Web environments. Additionally, operating system software may be configured to implement file access protocols such as network file system (NFS), common Internet file system (CIFS), direct access file system (DAFS), HTTP, or file transfer protocol (FTP). It is further contemplated that other types of operating system software for storage systems may be employed in conjunction with the present invention whereby configuration settings of the operating system software may be retrieved and archived to allow rebuilding of a storage system when the configuration settings are lost without departing from the scope and intent of the present invention.

Figure 9:
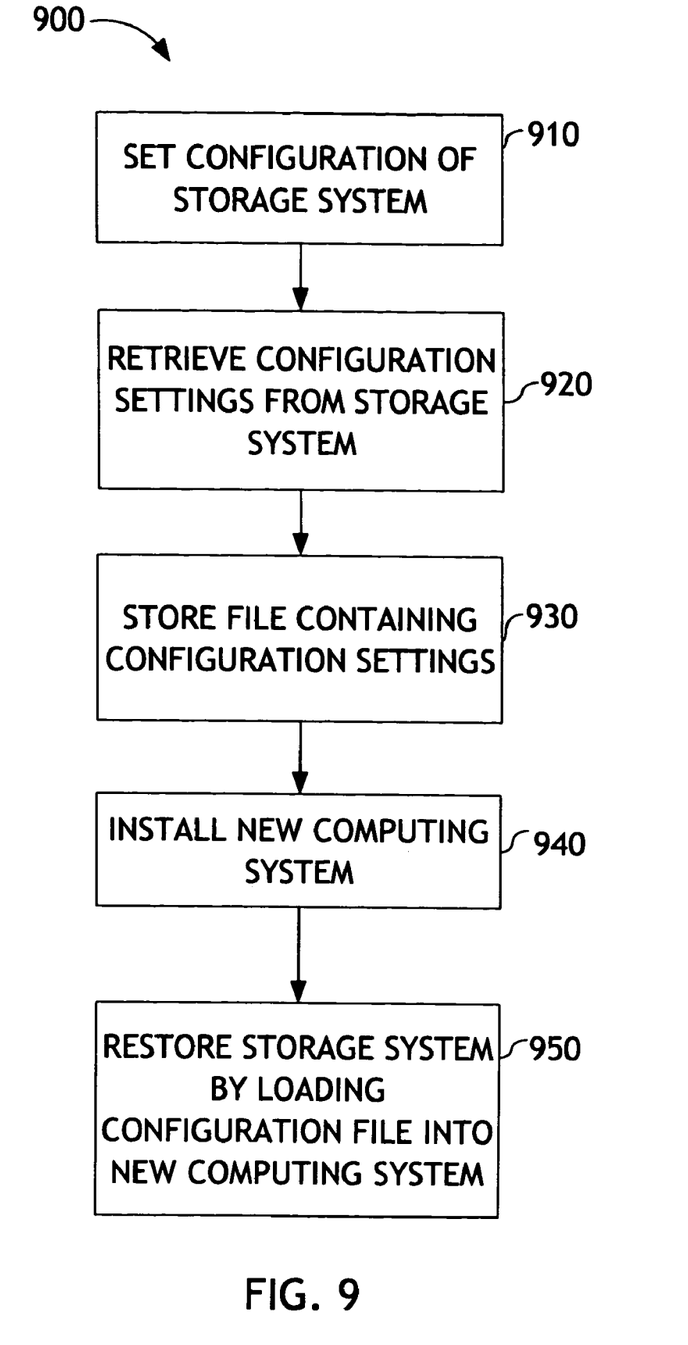
FIG. 9 depicts a process of restoring configuration settings in accordance with the present invention.
Figure 10:
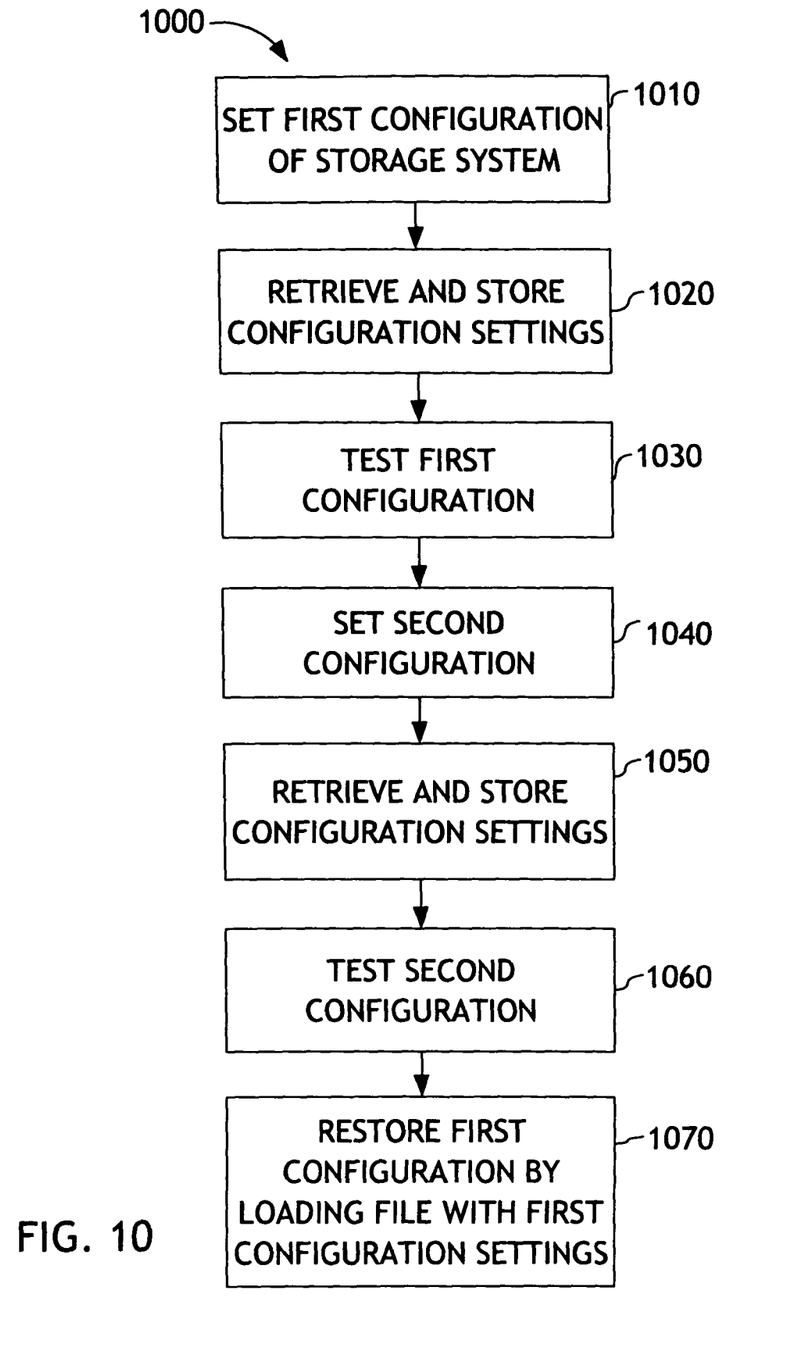
FIG. 10 depicts a process for testing multiple configurations in accordance with the present invention.

Referring generally to FIGS. 9-10, various examples of applications in which the system of the present invention may provide advantage are shown. It is contemplated that the computing system 800 of FIG. 8 and operating system software 100 of FIG. 1 may allow applications as discussed in FIGS. 9-10 in accordance with the present invention.

Referring to FIG. 9, a process 900 of restoring configuration settings in accordance with the present invention is shown. Process 900 may begin upon the setting of a configuration by an administrator 900. The configuration settings are retrieved 920 and stored in a configuration file that is stored at a remote location 930, such as network attached storage. Due to increased storage requirements and data management requirements, a new computing system 800 as shown in FIG. 8 may be necessary. Upon an install of the new computing system 940. The storage system may be restored by loading the configuration file into the new computing system 950. The configuration file, stored in network attached storage may be accessed and loaded into the new computing system as described in FIGS. 6-7. When the new computing system is rebooted, the storage system has the same configuration as the previous computing system. The advantageous aspect of this application is the reduction of time and resources for the administrator to manually reset the configuration settings of the storage system.

Referring to FIG. 10, a process 1000 for testing multiple configurations in accordance with the present invention is shown. One type of configuration change may be an upgrade of a software version. Other types of configuration changes may be new drivers, components, devices and the like installed to replace prior versions. In an advantageous aspect of the present invention, it may be possible to test storage systems prior to, and after, installation of software upgrade, component upgrade, and the like. As previously described, the detection module 130 in conjunction with the retention module may allow storage of multiple configuration files, including a latest configuration file which reflects the most current configuration of a storage system and previous configuration files which represent previous configurations of the storage system as shown in FIG. 4. Further, an original configuration file with revision files may also be utilized to load a desired configuration file.

Process 1000 may begin by the setting of a first configuration 1010. Then, the configuration settings may be retrieved and stored 1020 by the retrieval and retention modules 110-120 as shown in FIG. 1. In order to determine the performance of the first configuration, the first configuration may be tested 1030. A second configuration may be set 1040. Similarly, the second configuration settings may be retrieved and stored 1050. Testing of the second configuration may be the next step 1060. Results of the testing may dictate that the first or second configuration is provides optimal performance. In this example, the first configuration tested better than the second configuration. Rather than require the administrator to manually reset the configuration settings in conformity with the first configuration, the first configuration may be restored 1070 by retrieving and loading the configuration file representing the first configuration. Upon loading of the configuration file corresponding to the first configuration, the storage system may reflect the first configuration.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A storage system, comprising:
  a computing system, the computing system including a processor, a bus, a memory, a network interface, and a data storage device;
  a first remote computing system, the first remote computing system being operably connected via a network to the computing system and in a first distinct location from the computing system;
  a second remote computing system, the second remote computing system being operably connected via the network to the computing system and the first remote computing system, the second remote computing system located in a second distinct location from the computing system,
  wherein the computing system:
  retrieves a set of configuration settings of the storage system, the configuration settings including data describing a configuration of the storage system;

stores the set of configuration settings at the first remote computing system;

stores a copy of the set of configuration settings at the second remote computing system;

detects a change of the configuration of the storage system, the change of the configuration being automatically reflected in a changed set of configuration settings, wherein the changed set of configuration settings is stored at the first remote computing system and a copy of the changed set of configuration settings is stored at the second remote computing system;

restores the configuration of the storage system by loading at least one of the set of configuration settings or the changed set of configuration settings at the first remote computing system and applying the set of configuration settings to the first remote computing system, wherein at least one of set of configuration settings or changed set of configuration settings is loaded from the second remote computing system utilizing direct addressing; and reboots the first remote computing system.

2. The system as claimed in claim 1, wherein the set of configuration settings includes hardware settings and software settings.

3. A storage system, comprising:

a computing system, the computing system including a processor, a bus, a memory, a network interface, and a data storage device;

an administrative terminal, the administrative terminal operably connected to the computing system via a network;

a first remote computing system, the first remote computing system being operably connected via the network to the computing system and in a first distinct location from the computing system;

a second remote computing system, the second remote computing system being operably connected via a network to the computing system and the first remote computing system, the second remote computing system located in a second distinct location from the computing system, wherein the computing system:

retrieves a set of configuration settings of the storage system, the configuration settings including data describing a configuration of the storage system;

stores the set of configuration settings in a first file at the first remote computing system;

stores a copy of the first file containing the set of configuration settings at the second remote computing system;

detects a change of the configuration of the storage system;

queries the administrative terminal to create a second file upon the detection of the change of the configuration of the storage system;

receives a command to create the second file from the administrative terminal;

creates the second file, wherein the second file reflects the change of the configuration;

stores the second file which reflects the change of the configuration at the first remote computing system and stores a copy of the second file which reflects the change of the configuration at the second remote computing system; and restores the configuration of the storage system by loading the second file at the first remote computing system and the second remote computing system and applying the set of configuration settings to the first remote computing system and the second remote computing system; and reboots the first remote computing system and the second remote computing system.

4. The system as claimed in claim 3, wherein the set of configuration settings includes hardware settings and software settings.

5. The system as claimed in claim 3, wherein the first file and the second file include a timestamp which refers to production date of the first file and the second file.

6. The system as claimed in claim 5, wherein the timestamp reflects a date of the change to the set of configuration settings.

7. The system as claimed in claim 3, wherein the retrieval of the set of configuration settings includes removal of the set of configuration settings from a system configuration file of a computing system of the storage system.

8. A storage system, comprising:

a computing system, the computing system including a processor, a bus, a memory, a network interface, and a data storage device;

a first remote computing system, the first remote computing system being operably connected via a network to the computing system and in a first distinct location from the computing system;

a second remote computing system, the second remote computing system being operably connected via the network to the computing system and the first remote computing system, the second remote computing system located in a second distinct location from the computing system, wherein the computing system is configured for:

retrieves a first set of configuration settings of the storage system, the configuration settings including data describing a configuration of the storage system;

stores the first set of configuration settings in a first file at the first remote computing system;

stores a copy of the first file containing the set of configuration settings at the second remote computing system;

tests the first set of configuration settings;

determines a first performance of the first set of configuration settings;

retrieves a second set of configuration settings of the storage system, the configuration settings including data describing a second configuration of the storage system;

stores the second set of configuration settings in a second file at the first remote computing system;

stores a copy of the second file containing the second set of configuration settings at the second remote computing system;

tests the second set of configuration settings;

determines a second performance of the second set of configuration settings;

compares the first performance and the second performance to determine which one of the first configuration settings and the second configuration setting provides optimal performance; and restores at least one of the first configuration setting or the second configuration setting of the storage system based upon the which one of the first configuration setting and the second configuration setting provided optimal performance by loading at least one of the first file or the second file at the first remote computing system and the second remote computing system and applying the at least one of the first configuration setting or the second configuration setting to the first remote computing system and the second remote computing system; and reboots the first remote computing system and the second remote computing system.

9. The system as claimed in claim 8, wherein the first set of configuration settings and the second set of configuration settings include hardware settings and software settings.

10. The system as claimed in claim 8, wherein the first file and the second file include a timestamp which refers to production date of the first file and the second file.

11. The system as claimed in claim 10, wherein the timestamp reflects a date of the change to at least one of the first set of configuration settings or the second set of configuration settings.

12. The system as claimed in claim 8, wherein the retrieval of at least one of the first set of configuration settings or the second set of configuration settings includes removal of at least one of the first set of configuration settings or the second set of configuration settings from a system configuration file of a computing system of the storage system.

* * * * *